(12) United States Patent
Royalty

(10) Patent No.: US 7,962,748 B2
(45) Date of Patent: Jun. 14, 2011

(54) METHODS AND SYSTEMS FOR SECURING A COMPUTER NETWORK

(75) Inventor: Charles D. Royalty, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 885 days.

(21) Appl. No.: 11/538,580

(22) Filed: Oct. 4, 2006

(65) Prior Publication Data

US 2008/0086637 A1    Apr. 10, 2008

(51) Int. Cl.
H04L 9/32        (2006.01)
(52) U.S. Cl. ................... 713/168; 455/410; 455/411
(58) Field of Classification Search ............... 713/168; 455/414, 410–411
See application file for complete search history.

(56) References Cited

U.S. PATENT DOCUMENTS

| | | | |
|---|---|---|---|
| 6,259,909 B1 * | 7/2001 | Ratayczak et al. ............ | 455/411 |
| 6,876,293 B2 * | 4/2005 | Frolov et al. .................. | 340/5.7 |
| 6,915,986 B2 * | 7/2005 | D'Alvia ....................... | 244/118.5 |
| 2003/0216143 A1 | 11/2003 | Roese et al. | |
| 2003/0216144 A1 | 11/2003 | Roese et al. | |
| 2003/0217122 A1 | 11/2003 | Roese et al. | |
| 2003/0217137 A1 | 11/2003 | Roese et al. | |
| 2003/0217150 A1 | 11/2003 | Roese et al. | |
| 2003/0217151 A1 | 11/2003 | Roese et al. | |
| 2003/0225893 A1 | 12/2003 | Roese et al. | |

FOREIGN PATENT DOCUMENTS

| EP | 1280314 A2 | 1/2003 |
|---|---|---|
| FR | 2795264 | 12/2000 |

OTHER PUBLICATIONS

International Search Report for PCT/US2007/017611; Jan. 23, 2007; 15 pages.
Wargo, C. et al.; "Security Considerations for the e-Enabled Aircraft"; IEEE 2003; pp. 1-18.
Draft 03 (Strawman) of AEEC Project Paper 823. Datalink Security, Part 3, ACARS Message Security; Feb. 21, 2006; 49 pages.

\* cited by examiner

Primary Examiner — Thanhnga B Truong
Assistant Examiner — Angela Holmes
(74) Attorney, Agent, or Firm — Armstrong Teasdale LLP

(57) ABSTRACT

Methods and systems for establishing a secure access to a proprietary network is provided. The method includes establishing a communication link between a first device and the proprietary network using a first level of secure access to the network, requesting an access code by the first device. The method further includes generating an access code by the proprietary network in response to the request, receiving the access code by the first device, and entering the access code into a second device communicatively coupled to the proprietary network, wherein the second device is positioned in a secure location physically accessible only to an authorized user. The method also includes comparing the entered access code to the generated access code by the proprietary network, and enabling a second level of secure access between the first device and the proprietary network.

16 Claims, 2 Drawing Sheets

METHODS AND SYSTEMS FOR SECURING A COMPUTER NETWORK

BACKGROUND OF THE INVENTION

This invention relates generally to computer networks and more particularly, to methods and systems for securing computer networks from unauthorized access.

At least some known computer networks incorporate functionalities that are restricted from access to unauthorized users. Typically, access is restricted by requiring a predetermined code be entered at a prompt that is unique enough to a particular user that access to anyone other than that particular user is substantially assured. However, access to the network is generally permitted to a user regardless of the access point used to authenticate the user. For example, an enterprise network permits users to login from any computer or workstation that is communicatively coupled to the network. An enterprise network that includes the Internet as an access point permits a user to be essentially anywhere in the world while logging in to the enterprise network. Access to the enterprise network may be further controlled by restricting access to the enterprise network to access points within the physical control of the enterprise. For example, a local area network may be contained within a building or campus of buildings that is under the physical access control of the enterprise. However, due to human factors considerations and uncertainties about the reliability of authentication of users using a wireless connection to the network additional access controls are necessary.

BRIEF DESCRIPTION OF THE INVENTION

In one embodiment, a method of establishing a secure access to a proprietary network includes establishing a communication link between a first device and the proprietary network using a first level of secure access to the network, requesting an access code by the first device. The method further includes generating an access code by the proprietary network in response to the request, receiving the access code by the first device, and entering the access code into a second device communicatively coupled to the proprietary network, wherein the second device is positioned in a secure location physically accessible only to an authorized user. The method also includes comparing the entered access code to the generated access code by the proprietary network, and enabling a second level of secure access between the first device and the proprietary network.

In another embodiment, a secure proprietary network access system that provides location verification includes a proprietary network under the physical control of an enterprise, a first device adapted to communicate with the proprietary network using a first level of secure access to the proprietary network, the first device further adapted to receive an access code generated by the proprietary network for a second level of secure access to the proprietary network after receiving a request for the access code made by the first device, a second device communicatively coupled to the proprietary network, wherein the second device is positioned in a secure location physically accessible only to an authorized user, the second device is configured to receive the access code from a user in physical control of the first device and to transmit the access code to the proprietary network, wherein the proprietary network compares the access code transmitted by the second device to the access code generated by the proprietary network and if the access codes are identical, the proprietary network enables a second level of secure access between the first device and the proprietary network.

In yet another embodiment, a method of establishing a secure access to a proprietary network includes communicating with the proprietary network from a wireless device through a first communication link having a first level of secure of access, transmitting an access code for establishing a communication link having a second level of secure access to the wireless device, entering the access code into a second device communicatively coupled to the proprietary network through a second communication link, and enabling the second level of secure access for the first communication link for the wireless device.

DETAILED DESCRIPTION OF THE INVENTION

Figure 1:
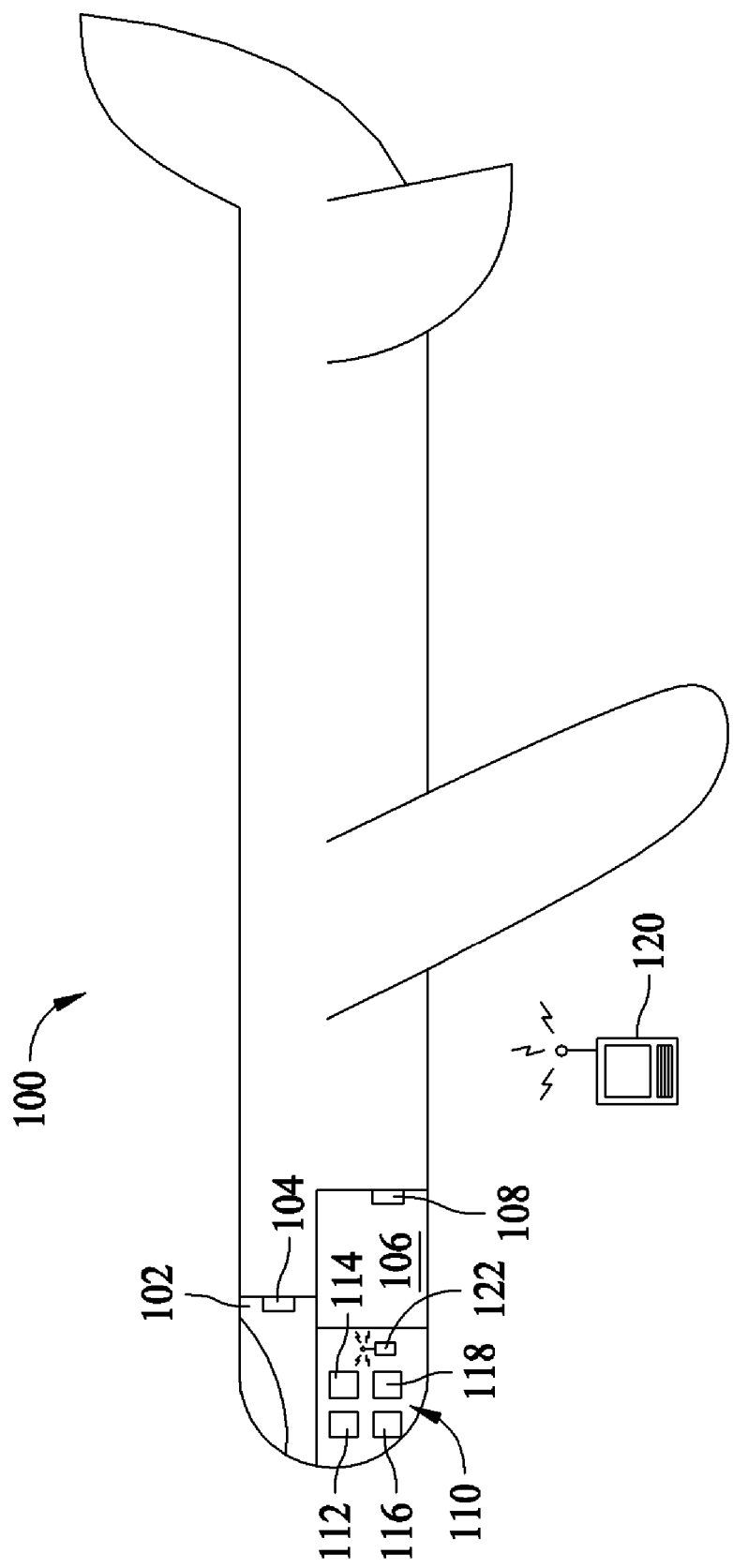
FIG. 1 is a side cross-sectional view of an aircraft in accordance with an embodiment of the present invention.

FIG. 1 is a side cross-sectional view of an aircraft 100 in accordance with an embodiment of the present invention. Aircraft 100 includes a cockpit 102 from which aircraft 100 is operated and controlled. Cockpit 102 is a secure access area onboard aircraft 100. For example, access procedures are required to be implemented before access to cockpit 102 is permitted. Cockpit 102 includes an input device 104. Aircraft 100 also includes an electronics bay 106 that is a secure access area onboard aircraft 100. Electronics bay 106 also includes an input device 108.

Aircraft 100 includes a computer network such as an aircraft data network (ADN) 110. In the exemplary embodiment, ADN 110 includes four domains with varying levels of security access requirements. ADN 110 includes an aircraft control domain 112, an airline information services domain 114, a passenger information and entertainment services domain 116, and a passenger-owned device domain 118. Aircraft control domain 112 includes flight and embedded control functions, and cabin core functions that are both used to control aircraft 100. Airline information services domain 114 includes administrative functions and passenger support functions used to operate aircraft 100. Airline information services domain 114 also includes role-specific functions such as, flight support functions, cabin support functions, and maintenance support functions. Passenger information and entertainment services domain 116 and passenger-owned device domain 118 are used to entertain the passengers. Passenger information and entertainment services domain 116 includes embedded IFE functions, a passenger Internet portal, an onboard passenger web, and a passenger device interface. Flight and embedded control functions include flight controls, forward displays, air traffic and airline operational communication functions, electrical, hydraulic, and pneumatic systems, and other systems associated with "safety and regularity of flight". Cabin Core functions include control of lighting (including reading lights with light switch inputs from In-Flight Entertainment), cabin attendant call control, cabin temperature, and public address system. Administrative functions include primarily information-system-based applications that support the crew with information that doesn't relate directly to flight or navigation, for example, electronic manuals, electronic versions of forms, sales support, and rebooking. Passenger support includes features that are a part of the airplane but are operated by the passengers such as in-seat game/movie display.

Aircraft control domain 112 is a closed domain that does not permit modification during flight and requiring a strict access control level. Airline information services domain 114 and passenger information and entertainment services domain 116 are private domains using a privacy level of access control, and passenger-owned device domain 118 is a public domain.

In addition, aircraft control domain 112 airline information services domain 114, and passenger information and entertainment services domain 116 all include an air/ground network interface.

During operation, the various domains are in operation and providing data transmission services between devices communicatively coupled to ADN 110. Portions of ADN 110 include wireless access point support 120 such as through standard 802.11. As used herein, 802.11 refers to a family of specifications developed by the IEEE for wireless LAN technology. Standard 802.11 specifies an over-the-air interface between a wireless client and a base station or between two wireless clients. Although embodiments of the present invention are described with reference to a particular network standard, it is understood that further revisions of that standard or use of other standards is considered within the scope of the present invention.

To further provide secure access to ADN 110 access to one or more domains or functionalities of domains may be dependent on location verification of the device requesting access. For example, a maintenance control display panel is used by aircraft maintenance personnel to access aircraft components and systems for operational testing of the components and systems and for updating software executing on various processors comprising the aircraft monitoring, warning and control sub-systems. When the aircraft maintenance personnel request access to the aircraft systems using the maintenance control display panel, secure access between the aircraft data network and the wireless maintenance control display panel requesting the access and no other can be assured by requiring an access code generated by the aircraft data network to be entered from a location on the aircraft that is physically in the control of the aircraft access procedures. For example, in one embodiment, the flight deck access system keypad is used to initiate a challenge/response function with the operator of a wireless maintenance control display panel. The response demonstrates the operator has gained physical access to the airplane and is, in fact, at the flight deck door. In an alternative embodiment, the cabin interphone is used to dial the access code into the aircraft data network.

Figure 2:
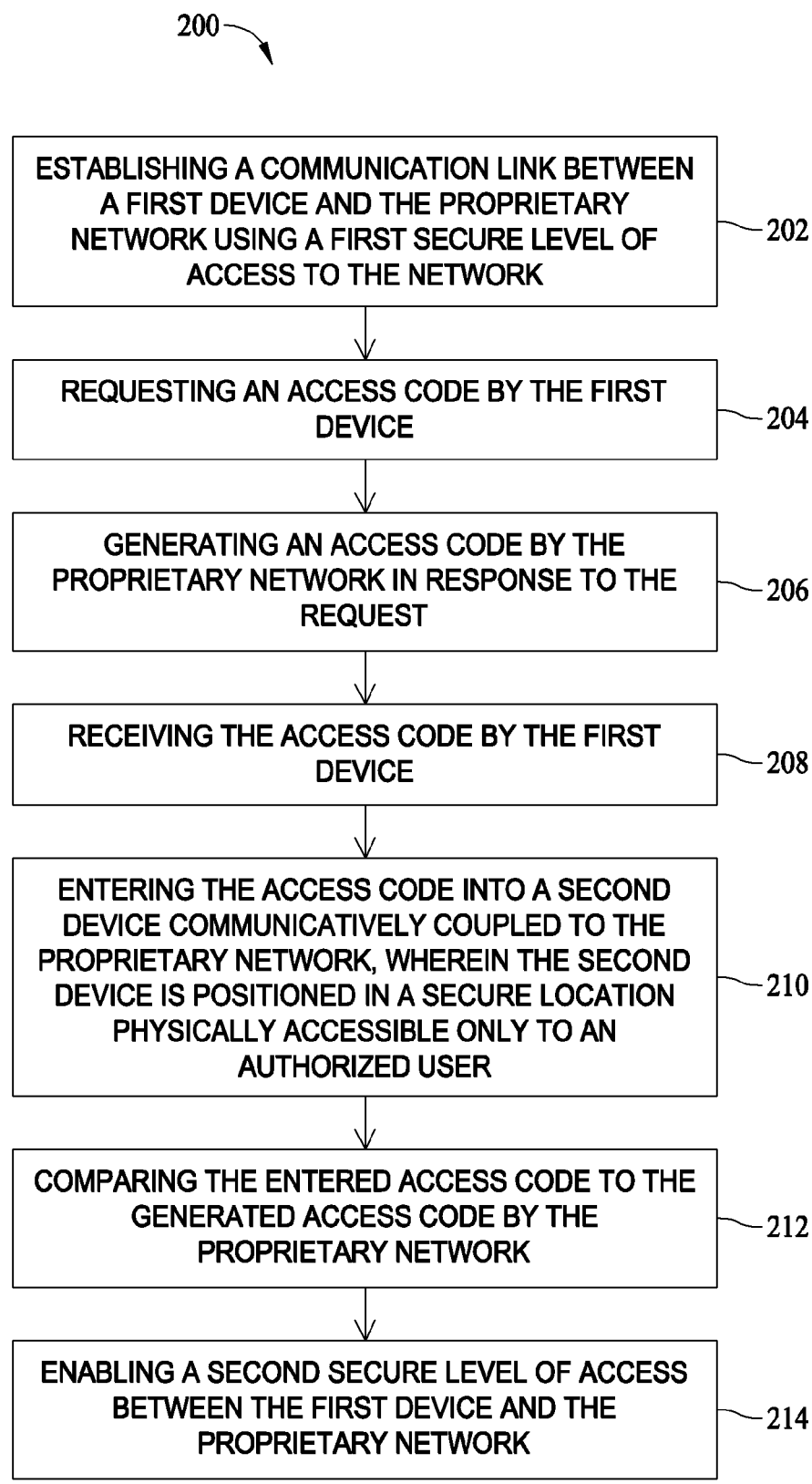
FIG. 2 is a flow diagram of an exemplary method for establishing a secure access to a proprietary network that may be used with the aircraft shown in FIG. 1.

FIG. 2 is a flow diagram of an exemplary method 200 for establishing a secure access to a proprietary network that may be used with aircraft 100 (shown in FIG. 1). Method 200 includes establishing 202 a communication link between a first device and the proprietary network using a first level of secure access to the network. The proprietary network is a network in the control of an enterprise such as a business, company or organization, wherein access to the network is controlled by the enterprise and unauthorized users are substantially prevented from gaining access to the network. In the exemplary embodiment, the first device is a communication link is a maintenance control display (MCD) that is used by aircraft maintenance personnel to gain access to and control various components on board the aircraft. MCD is typically a portable computer configured with software, firmware, and accessories that enable the MCD to perform the functions described herein. The communication link may be a hardwire connection through a plug and socket arrangement or other connection that communicatively couples the MCD to the proprietary network. Because the MCD is used to download control files to the aircraft and to control the operation of various systems and equipment on the aircraft for maintenance, troubleshooting and/or testing, it is important for the MCD to be communicating with the proper aircraft. Using a hardwire connection between the MCD and the proprietary network requires only proper physical verification that the aircraft being coupled to is the proper aircraft. However, using an MCD having a wireless capability, proper verification that the aircraft being coupled to is the proper aircraft is more difficult. For example, aircraft parked near each other may be able to receive signals from a single MCD that is within range. A user of the MCD may inadvertently connect to the proprietary network of an aircraft that is not intended to be maintained. Using a wireless MCD permits a user such as a maintenance technician to perform control functions of the aircraft from a local position. For example, moving an elevator flap may require one or more users to verify the area around the intended movement is clear, walk from the local position to the flight deck to manipulate the flap control, return to the local position to verify proper movement of the flap, then a return to the flight deck to release control of the flap. Using a wireless MCD permits the user to maintain his position at the flap to prevent other personnel from moving into the area of the intended movement and reduces the need to walk from the local position to the flight deck to actuate the control. The wireless MCD permits the user to conduct functional testing local to the components being tested. Such ability reduces manpower requirements and time needed to accomplish the tasks. If however, the user logs into the wrong aircraft's network to perform maintenance, a hazardous situation may be created. For example, the user may be actuating equipment on an aircraft that he has not ensured is clear of personnel.

Method 200 further includes requesting 204 an access code by the wireless MCD. The access code is generated 206 as requested using a device such as a served communicatively coupled to the proprietary network. The algorithm generating the access code is sufficiently robust to provide a predetermined level of assurance that the access code cannot be generated by another device that is not coupled to the network. The generated code is transmitted back to the requesting wireless MCD. The MCD receives 208 the access code, where it is displayed to the user. The user then enters the displayed access code into a second device communicatively coupled to the proprietary network. In the exemplary embodiment, the second device comprises, for example, but not limited to a cabin interphone or flight deck or electronics bay access keypad. The second device is positioned in a secure location physically accessible only to an authorized user. The second device communicates with the proprietary network through a separate communications link than the MCD and from a location known to be under the control of the aircraft's physical security procedures. The entered access code is compared 210 to the generated access code by the proprietary network, and a second level of secure access between the first device and the proprietary network is enabled based on the comparison. Using the location verification method described above, the user is given access to the network that he is physically located at and that he already has physical access permission to.

The above-described methods and apparatus for establishing a secure access to a proprietary network are cost-effective and highly reliable. The network receives a request for an access code for a more secure level of access to the network.

The network transmits the requested access code to the requesting device. The access code is then entered into a second device coupled to the network wherein the second device is fixed in a known secure location. The network compares the transmitted and the received access codes before enabling the more secure level of access to the network. The method facilitates location verification of a user prior to granting a more secure level of access to the network in a cost-effective and reliable manner.

While the invention has been described in terms of various specific embodiments, those skilled in the art will recognize that the invention can be practiced with modification within the spirit and scope of the claims.

What is claimed is:

1. A method of establishing a secure access to a specific proprietary network, the method comprising the steps of:
    establishing a wireless communication link between a first device and a proprietary network believed to be the specific proprietary network using a first level of secure access to the network;
    requesting an access code from the proprietary network by the first device;
    generating the access code within the proprietary network in response to the request;
    receiving the access code from the proprietary network by the first device;
    manually entering the access code, as received by the first device, into a second device believed to be communicatively coupled to and in physical proximity with the specific proprietary network, wherein the second device is positioned in a secure location physically accessible only to an authorized user and communicatively coupled to only a specific proprietary network;
    comparing the entered access code to the generated access code by the proprietary network;
    using a result of the comparison to verify that the wireless communication link established between the first device and the proprietary network is a communication link established between the first device and the specific proprietary network; and
    enabling a second level of secure access between the first device and the specific proprietary network if the entered access code matches the generated access code.

2. A method in accordance with claim 1 wherein said establishing a communication link between a first device and the proprietary network comprises establishing a communication link between a wireless device and the proprietary network.

3. A method in accordance with claim 1 wherein said receiving the access code from the proprietary network by the first device comprises receiving the access code through the established communication link.

4. A method in accordance with claim 1 wherein the proprietary network includes at least one of an internal network of an enterprise and a network of a mobile platform.

5. A method in accordance with claim 1 wherein said requesting an access code by the wireless device comprises requesting the access code for a second level of secure access.

6. A method in accordance with claim 1 wherein said entering the access code into a second device comprises entering the access code into the second device within a predetermined time-out period.

7. A secure proprietary network access system that provides verification as to availability of network access based on a physical location of a network access device, said system comprising:
    at least one proprietary network under the physical control of an enterprise;
    a first device adapted to communicate with proprietary networks such as the at least one proprietary network using a first level of secure access to such proprietary networks;
    a second device communicatively coupled to and physically proximate a specific proprietary network, wherein the second device is positioned in a secure location physically accessible only to an authorized user, said second device is configured to receive a manually entered access code from a user in physical control of the first device and the second device, said second device operable to transmit the manually entered access code to the specific proprietary network;
    wherein, upon an accessing of a proprietary network by said first device, said first device is operable to request an access code from the network such that an access code received from said proprietary network by said first device can be subsequently manually entered into said second device for transmission to the specific proprietary network associated with said second device for purposes of verifying that the proprietary network accessed by said first device and the specific proprietary network associated with said second device are the same proprietary network, and if so, the proprietary network enables a second level of secure access between the first device and the proprietary network.

8. A system in accordance with claim 7 wherein said first device is adapted to establish a wireless communication link between a first device and the proprietary network.

9. A system in accordance with claim 7 wherein said second device is adapted to receive the access code manually entered by a user.

10. A system in accordance with claim 7 wherein the proprietary network includes at least one of an internal network of an enterprise and a network of a mobile platform.

11. A method of establishing a secure access to a specific proprietary network using a wireless device, the method comprising the steps of:
    communicating with a proprietary network from the wireless device through a first communication link having a first level of secure access;
    requesting an access code for a second level of secure access by the wireless device;
    generating the access code for the second level of secure access by the proprietary network based on said requested access code by the wireless device;
    transmitting the access code for establishing a communication link having a second level of secure access to the wireless device from the proprietary network through the first communication link;
    receiving at a second device, as entered by a user, the access code as received by the wireless device, the second device communicatively coupled to a specific proprietary network through a second communication link, the second device located in a physically secure location associated with the specific proprietary network, such that both the first and second devices are physically accessible to the authorized user; and
    receiving, at the wireless device, an indication as to whether the access code was entered successfully, a successful indication indicating that the proprietary network accessed by the wireless device and the specific proprietary network associated with the second device are the same proprietary network thereby enabling the second level of secure access for the first communication link between the wireless device and the proprietary network.

12. A method in accordance with claim 11 transmitting the access code for establishing a communication link having a second level of secure access to the wireless device comprises transmitting the access code through the first communication link.

13. A method in accordance with claim 11 wherein entering the access code into a second device comprises entering the access code into the second device within a predetermined time period.

14. A method in accordance with claim 11 wherein enabling the second level of secure access comprises comparing the entered access code to the transmitted access code.

15. A method in accordance with claim 11 wherein communicating with the proprietary network from a wireless device comprises communicating with an internal network of an enterprise wherein the enterprise maintains physical control of the network.

16. A method in accordance with claim 11 wherein communicating with the proprietary network from a wireless device comprises communicating with an aircraft data network.

* * * * *